(No Model.) 6 Sheets—Sheet 3.
W. BLISS, E. BRADBURY & A. H. GIBSON.
APPARATUS FOR BURNING GAS TAR OR OTHER LIQUID FUEL.
No. 450,052. Patented Apr. 7, 1891.
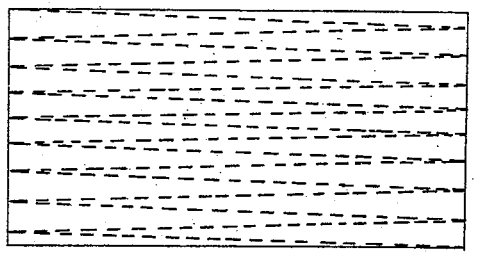
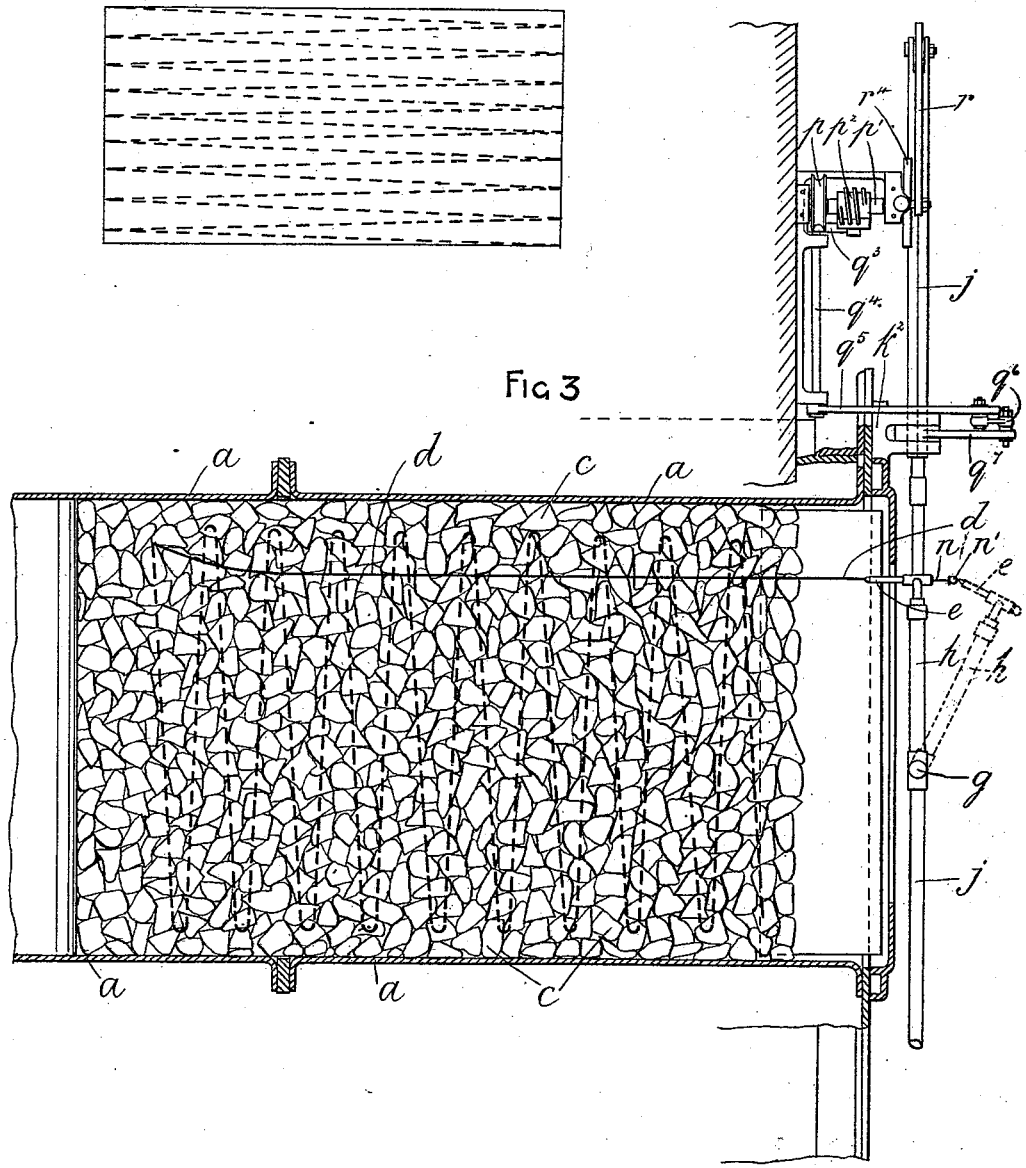
WITNESSES
Herbert Whitehouse
George Herbert Bloye
INVENTORS
William Bliss
Enoch Bradbury
Arthur Henry Gibson
per Charles Bosworth Kelley
Attorney (No Model.) 6 Sheets—Sheet 4.
W. BLISS, E. BRADBURY & A. H. GIBSON.
APPARATUS FOR BURNING GAS TAR OR OTHER LIQUID FUEL.
No. 450,052. Patented Apr. 7, 1891.
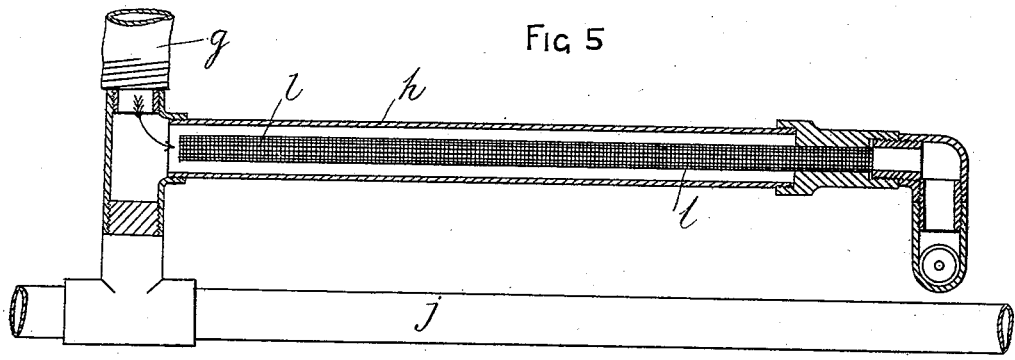
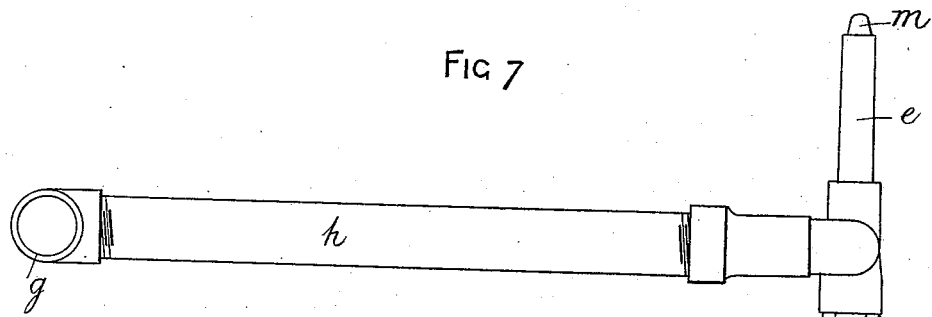
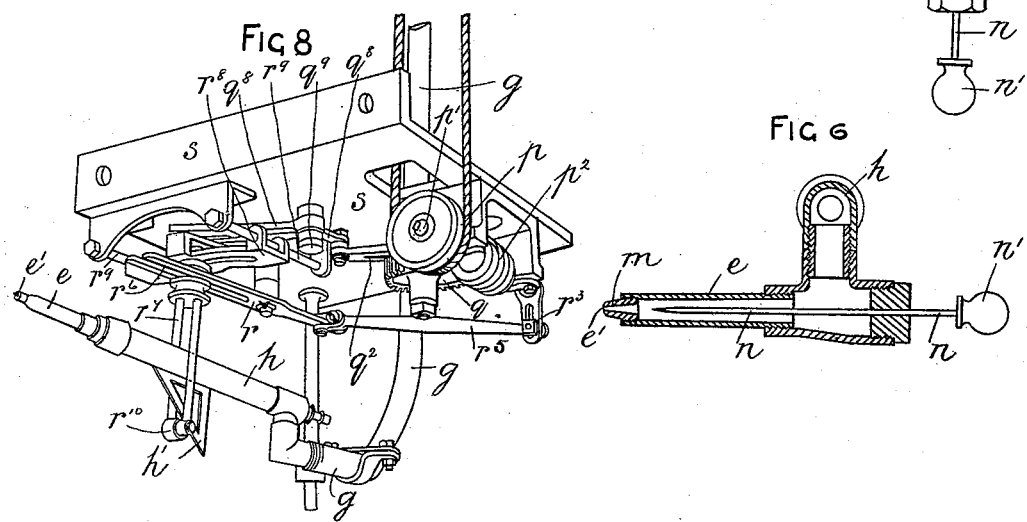
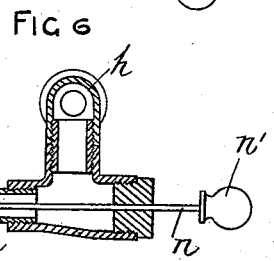
WITNESSES
INVENTORS
William Bliss
Enoch Bradbury
Arthur Henry Gibson
per Charles Bosworth Kelley
Attorney

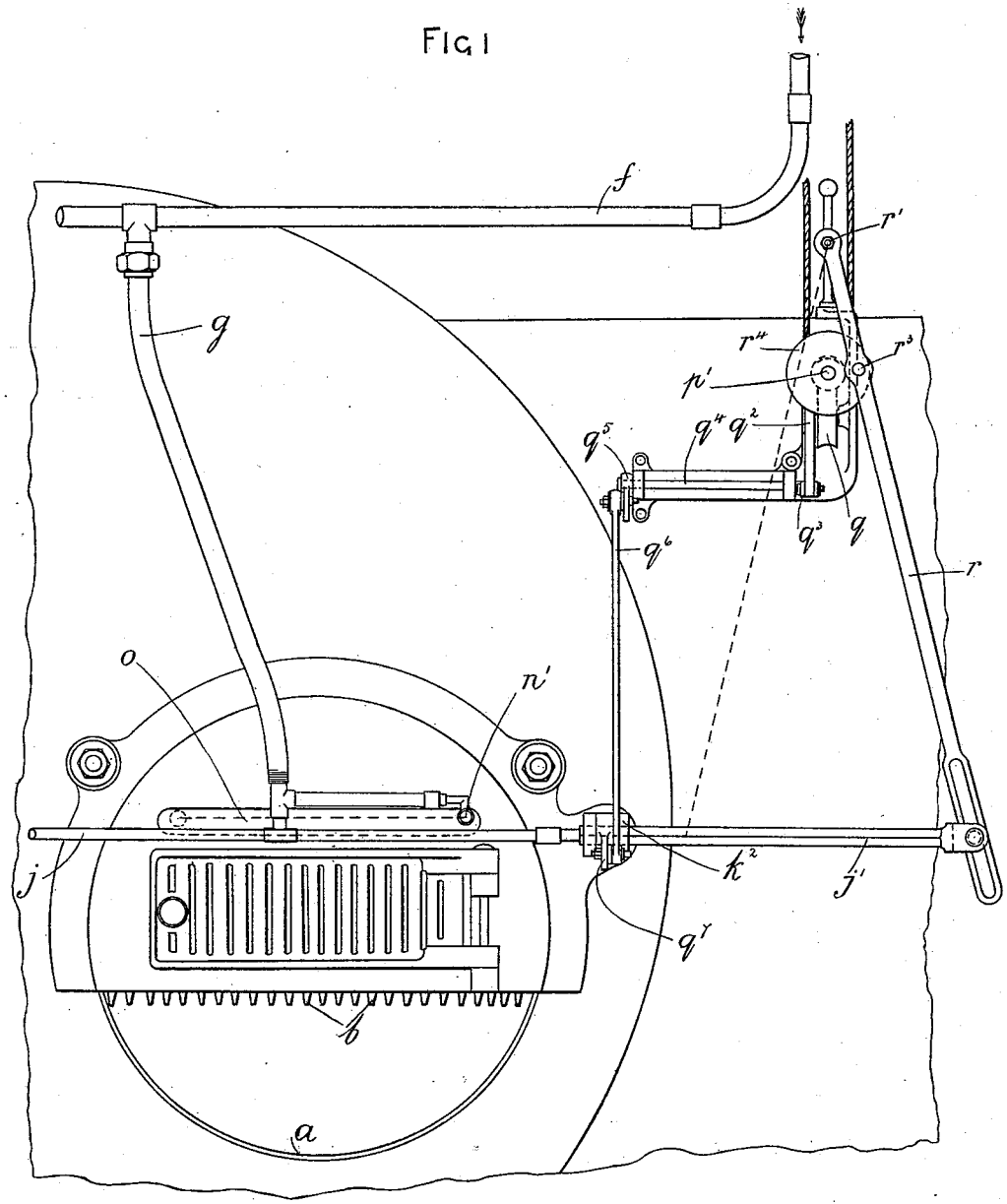

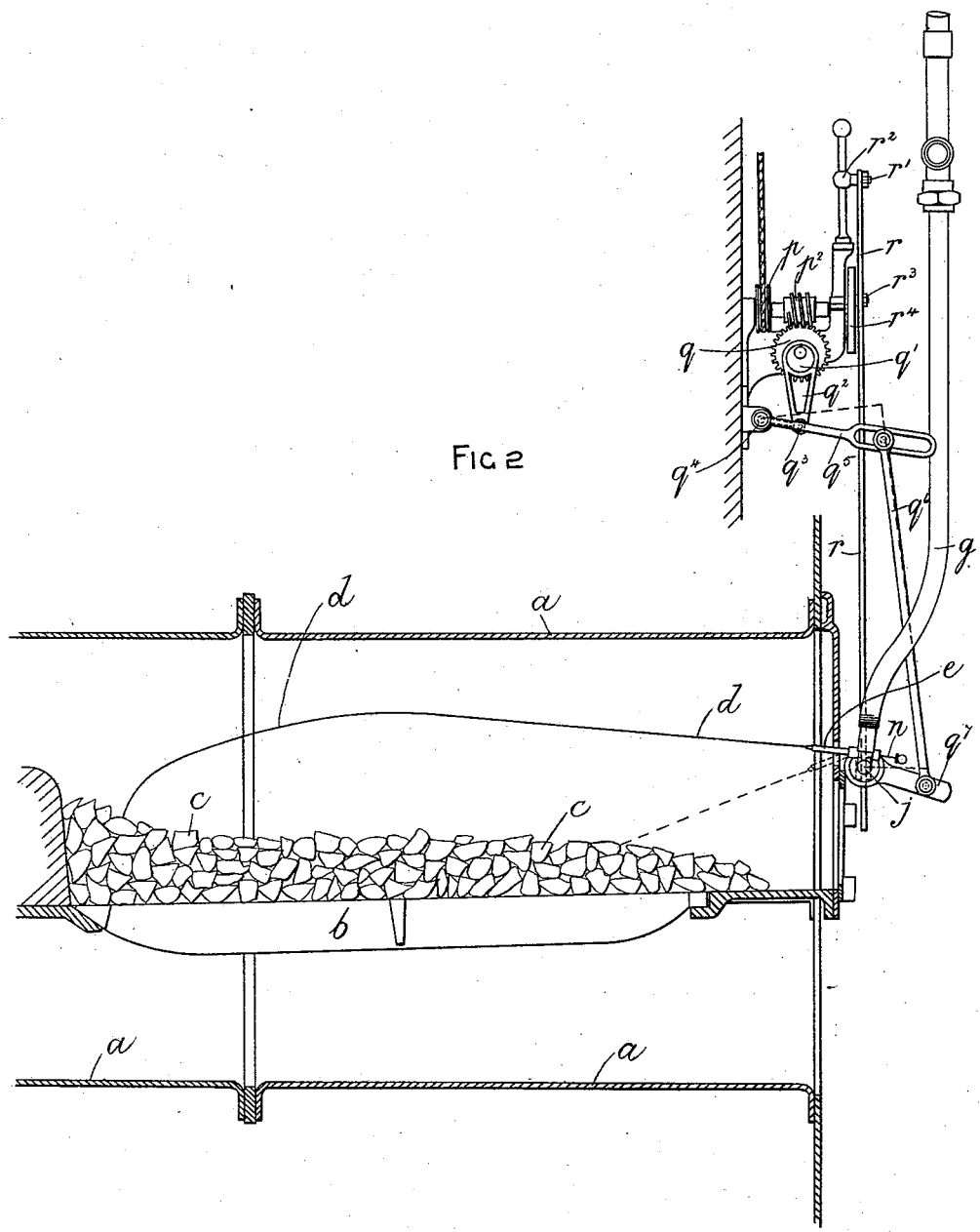

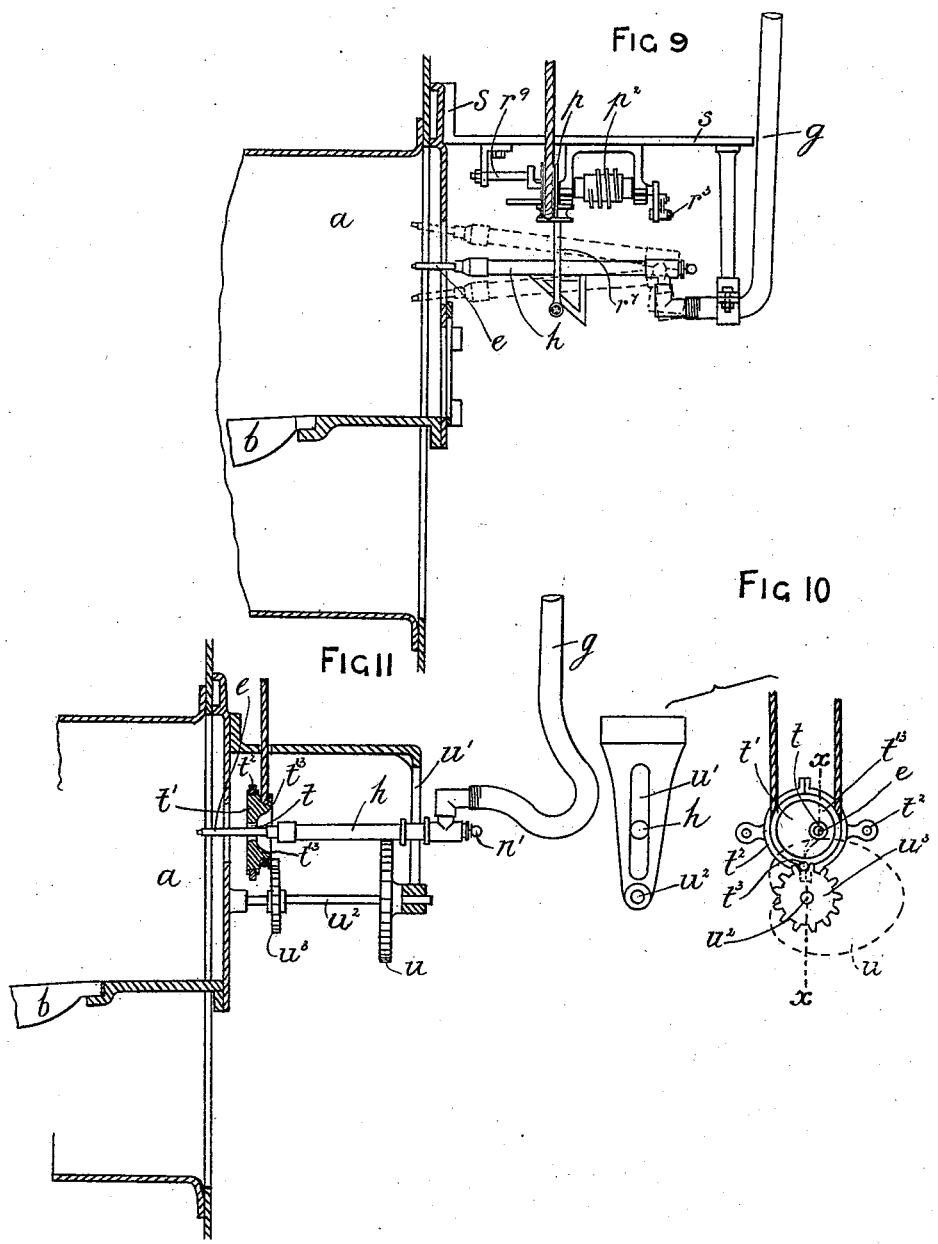

(No Model.) 6 Sheets—Sheet 6.
W. BLISS, E. BRADBURY & A. H. GIBSON.
APPARATUS FOR BURNING GAS TAR OR OTHER LIQUID FUEL.
No. 450,052. Patented Apr. 7, 1891.
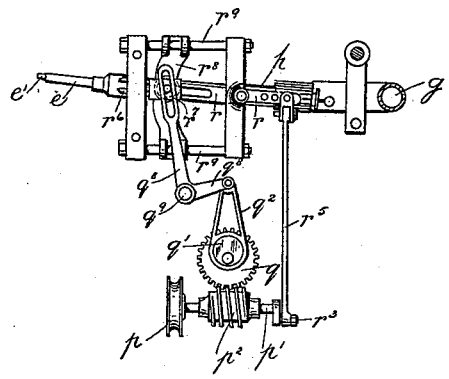

UNITED STATES PATENT OFFICE.

WILLIAM BLISS AND ENOCH BRADBURY, OF CHIPPING NORTON, AND ARTHUR HENRY GIBSON, OF BIRMINGHAM, ENGLAND.

APPARATUS FOR BURNING GAS-TAR OR OTHER LIQUID FUEL.

SPECIFICATION forming part of Letters Patent No. 450,052, dated April 7, 1891.

Application filed March 25, 1890. Serial No. 345,272. (No model.)

*To all whom it may concern:*

Be it known that we, WILLIAM BLISS, ENOCH BRADBURY, and ARTHUR HENRY GIBSON, subjects of Her Majesty the Queen of Great Britain, the two first named residing at Chipping Norton, in the county of Oxford, England, and the last named at the city of Birmingham, England, have invented certain new and useful Improvements in and Connected with Apparatus for Burning Gas-Tar or other Liquid Fuel in Steam-Boiler and other Furnaces, of which the following is a specification.

This invention consists of the herein-described improvements in and connected with apparatus for burning gas-tar or other liquid fuel in steam-boiler and other furnaces; and the said invention as applied, for instance, to a Lancashire boiler is carried out as follows:

We cover the surface of the fire-bars, which may be of ordinary form, with anthracite coal, coke, asbestus, or other slowly-combustible or incombustible material as a medium for igniting or burning the liquid fuel thrown upon it, the said material being by preference banked up rather higher toward the back of the furnace and in sufficiently large lumps to allow of a free passage of air therethrough. The gas-tar or other liquid fuel is injected onto the surface of the said material in a very fine stream, which is automatically moved to and fro, up and down, and across the furnace, so as to be evenly distributed over the whole area. When the liquid fuel which is injected into the furnace is lighted and has been burning for a short time, the anthracite coal, coke, asbestus, or other slowly-combustible or incombustible material becomes thoroughly hot and forms a mass of incandescent fuel, which heats and burns up the liquid fuel descending upon it.

On the accompanying drawings, Figure 1 illustrates, in front elevation, part of a Lancashire boiler with our invention applied. Fig. 2 is a side elevation of the operating mechanism with the boiler in section; and Fig. 3 is a sectional plan of one of the furnaces of the same, together with the liquid-fuel-feeding mechanism. Fig. 4 is a diagram to illustrate a modification of the same. Figs. 5, 6, and 7 show the nozzle or burner of the said liquid-fuel-feeding apparatus and parts immediately connected therewith on an enlarged scale. Figs. 8 and 9 illustrate a modified form of our invention. Fig. $9^a$ is a plan view of the modification shown in Fig. 8 with the supporting-bracket removed; and Figs. 10 and 11 illustrate a further modification of the same, Fig. 2 showing the nozzle-holder in section on line $x\,x$ of Fig. 10.

The same letters of reference indicate the same or corresponding parts in all the figures of the drawings.

$a$ is the furnace-tube of the boiler.

$b\,b$ are the fire-bars of any ordinary kind, and the lumps of anthracite coal, coke, asbestus, or other slowly-combustible or incombustible material is marked $c$.

$d$ is the fine stream of tar or other liquid fuel which issues through the nozzle $e$ under pressure into the furnace, and in this example moves rapidly to and fro across the furnace, and at the same time moves slowly to and fro along the same, so that the liquid fuel is distributed over the surface of the furnace in a zigzag manner, about as indicated by the dotted lines in Fig. 3. The speed at which the stream of liquid fuel is moved about over the furnace is such that it reaches the different parts of the furnace just before the fuel burning there has been consumed, so as to keep up a constant heat.

In practice we find that when burning gas-tar in a furnace twenty-six inches wide by six feet long we obtain good results with a nozzle-orifice of about one-twentieth of an inch in diameter and a pressure due to a twenty-foot head, the speed of the stream across the furnace being about fifty double strokes per minute, during which time the stream moves from the front to the back of the furnace and back again. From these data the proper speeds at which the stream of liquid fuel should be moved in furnaces of other sizes can readily be calculated.

The apparatus which we prefer to employ for automatically injecting and distributing the tar or other liquid fuel in the furnace is illustrated by Figs. 1, 2, 3, 5, 6, and 7. It consists of a main pipe $f$, by which the tar or other liquid fuel descends from a tank overhead (not shown upon the drawings) having a flexible hose-pipe $g$ for each furnace, leading, respectively, to the injector-pipes, (only one of these is shown, and marked $h$,) which are carried by the horizontal rod or tube $j$, free to slide in bearings $k^2$, fixed to the furnace-front or otherwise supported. Each injector-pipe $h$ contains a tubular filter $l$, formed of finely-perforated sheet metal or wire-gauze, through which the liquid fuel passes and which prevents any solid particles passing to the nozzle or burner $e$, which, as above stated, has a very small orifice $e'$ at its front end, through which the liquid fuel issues. The said front end is preferably made as a removable nose $m$, (which may be of hardened steel,) so as to be readily renewed. $n$ is a needle, similar to a darning-needle, passing through the back end of the nozzle $e$ and furnished at its outer end with a knob $n'$, by which the needle can be moved either to close the orifice $e'$ or to regulate the opening of the same and the amount of liquid fuel passing therethrough or to remove any obstruction therefrom.

The nozzle $e$ projects through the horizontal slot $o$ in the furnace-front and has a combined lateral and vertical movement imparted to it by the mechanism represented as fixed to the front wall of the boiler-seating at the right-hand side of the boiler. This mechanism consists of the driving-pulley $p$, mounted upon the shaft $p'$, on which is the worm $p^2$, gearing with the worm-wheel $q$ below. Fixed to this worm-wheel is an eccentric $q'$, which by the eccentric-rod $q^2$ and lever $q^3$, rocking-shaft $q^4$, crank-arm $q^5$, connecting-rod $q^6$, and crank-arm $q^7$ imparts a rotary movement to the tube or bar $j$ and the nozzle or nozzles $e$, carried thereby, is moved pivotally, and its front end is elevated and depressed, so as to move the stream of liquid fuel from front to back of the furnace, and vice versa. The lateral movement of the rod or tube $j$ is obtained by the swinging rod $r$, which is suspended at $r'$ to the slide $r^2$, and is caused to oscillate by the crank-pin $r^3$ on the disk $r^4$, fixed to the shaft $p'$. The lower part of the rod $r$ is slotted and embraces a roller at the forked end of the rod or tube $j$. The part $j'$ of this rod or tube is preferably made square in cross-section, and the hole in the crank-arm $q^7$ is of corresponding form, so that while the rod or tube $j$ is being turned by the crank-arm $q^7$ it can also slide to and fro.

From actual experiment we have found that the combined rapid lateral and slow vertical pivotal movement of the nozzle gives the best results; but we do not limit our invention to this, as it will be evident that the stream of liquid fuel can be arranged to move in other ways without departing from the spirit of our invention. For instance, if the nozzle has a combined slow lateral and rapid vertical pivotal movement the liquid fuel will be distributed in a zigzag fashion up and down the furnace, as shown on the small-scale diagram, Fig. 4.

In the modification illustrated by Figs. 8 and 9 the injector-tube $h$ is arranged to swing upon its end as a pivot, to which the flexible pipe $g$ is fixed. In this example the oscillating rod $r$, which imparts the lateral movement to the nozzle $e$, is arranged horizontally and connected at one end to the crank-pin $r^3$ by the connecting-rod $r^5$. The slotted end $r^6$ of the rod $r$ embraces the upper part of the fork $r^7$, which is fixed to the slide $r^8$, free to move along the guides $r^9$. The fork $r^7$ embraces the injector-tube $h$, so as to allow of the tube $h$ moving up or down. The injector-tube $h$ is raised or lowered by the fork $r^7$ moving to and fro along the same, a roller $r^{10}$ at the bottom of the fork acting upon an incline $h'$, fixed to the under side of the injector-tube $h$. The slide $r^8$ is moved to and fro along the guides by the eccentric-rod $q^2$, which is connected thereto by the bell-crank lever $q^8$, turning on the pin $q^9$. The eccentric-rod $q^2$ is driven, in substantially the same manner as before described in connection with Figs. 1 and 2, from the shaft $p'$ by a worm $p^2$ and a worm-wheel $q$, having an eccentric $q'$, and the crank-pin $r^3$ is also moved, in a manner similar to that before described, from shaft $p'$. This mechanism is carried by a bracket $s$, fixed to the boiler-front or otherwise.

In the modification illustrated by Figs. 10 and 11 the nozzle $e$ has a rapid circular movement in a vertical plane, which causes the stream of liquid fuel to make an elliptical path on the furnace-bottom, and by the back end of the injector-tube being slowly moved up and down a series of ellipses are formed on the furnace-bottom, crossing each other. The circular motion of the nozzle is obtained by the nozzle passing through a hole $t$, which is eccentric in the revolving disk $t'$, carried by the guides $t^2$, this disk receiving rotary motion by the pulley $t^{13}$, fixed to the disk $t'$. The back end of the injector-tube $h$ is supported on the cam $u$ and guided vertically by the guides $u'$. The cam $u$, mounted on the shaft $u^2$, is caused to revolve slowly by a pin $t^3$ on the disk $t'$, which at every revolution turns the cog-wheel $u^3$, on the shaft $u^2$ through the space of one tooth.

In the arrangement illustrated by Figs. 1 2, and 3 the tube or rod $j$ can be continued so as to carry any number of injector-tubes and nozzles, so as to feed a range of furnaces, provided they are in a parallel line, and thus one set of mechanism will serve for a range of boilers.

Our invention can be applied to other furnaces similarly as above described with reference to a steam-boiler furnace.

In conclusion, we wish it to be understood that we do not limit ourselves to the precise details hereinbefore described, and illustrated by the accompanying drawings, as the same can be varied without departing from the nature of our invention. Nor do we make any claim to the particular form of injector-tube, filter, and nozzle hereinbefore described and illustrated, as these form no part of our invention.

What we claim as our invention, and desire to secure by Letters Patent, is—

1. In combination, the furnace, a nozzle movably supported, and means for moving said nozzle both laterally and vertically, substantially as described.

2. In combination, the furnace, a nozzle, means for supporting the nozzle pivotally, and means for tilting the nozzle and for operating it laterally, substantially as described.

3. In combination, the furnace, the nozzle movable laterally, and means for moving it, said nozzle also being supported to have tilting movement, and an eccentric in connection with the nozzle for tilting it, substantially as described.

4. In combination, the nozzle supported to have movement laterally and vertically, a shaft $p'$, with a crank-arm connected to the nozzle for moving it laterally, and means for moving the nozzle vertically and causing the stream to traverse the furnace longitudinally, substantially as described.

5. In combination, the furnace, the tilting nozzle supported on the rod $j$, the pipe $g$, connected with the nozzle, the means for operating the rod $j$ longitudinally, and the means for rotating it, substantially as described.

In testimony whereof we have each signed our names in the presence of two subscribing witnesses.

WILLIAM BLISS.
ENOCH BRADBURY.
ARTHUR HENRY GIBSON.

Witnesses:
CHARLES BOSWORTH KETLEY,
HERBERT WHITEHOUSE.